(12) United States Patent
    Yang et al.

(10) Patent No.: US 12,676,318 B2
(45) Date of Patent: Jul. 7, 2026

(54) AUXILIARY FILM

(71) Applicant: PROLOGIUM TECHNOLOGY CO., LTD., Taoyuan City (TW)

(72) Inventors: Szu-Nan Yang, Taoyuan City (TW); Chen-Chi Wu, Taoyuan City (TW); Hung-Liang Hsu, Taoyuan City (TW); Chih-Yuan Lin, Taoyuan City (TW); Chih-Lung Hsiao, Taoyuan City (TW); Ming-Yueh Hsu, Taoyuan City (TW)

(73) Assignee: PROLOGIUM TECHNOLOGY CO., LTD., Taoyuan City (TW)

( * ) Notice: Subject to any disclaimer, the term of this patent is extended or adjusted under 35 U.S.C. 154(b) by 635 days.

(21) Appl. No.: 18/134,804

(22) Filed: Apr. 14, 2023

(65) Prior Publication Data

US 2023/0335751 A1      Oct. 19, 2023

(30) Foreign Application Priority Data

Apr. 18, 2022    (TW) .................................. 111114674

(51) Int. Cl.
    *B32B 3/30*        (2006.01)
    *H01M 4/66*        (2006.01)
    *H01M 10/052*      (2010.01)

(52) U.S. Cl.
    CPC .............. *H01M 4/667* (2013.01); *B32B 3/30* (2013.01); *H01M 4/661* (2013.01); *H01M 10/052* (2013.01)

(58) Field of Classification Search
    CPC ....................................................... B32B 3/30
    See application file for complete search history.

(56) References Cited

U.S. PATENT DOCUMENTS

| | | | | |
|---|---|---|---|---|
| 5,296,277 | A * | 3/1994 | Wilson ....................... | C09J 7/38 |
| | | | | 428/161 |
| 2012/0141732 | A1* | 6/2012 | Patel .................... | B65G 49/069 |
| | | | | 428/141 |
| 2013/0149509 | A1* | 6/2013 | Federico .................... | C09J 7/29 |
| | | | | 156/247 |

(Continued)

FOREIGN PATENT DOCUMENTS

| | | |
|---|---|---|
| CN | 100404243 | 7/2008 |
| CN | 109585704 | 4/2019 |
| EP | 2796200 A2 | 10/2014 |

(Continued)

OTHER PUBLICATIONS

European Patent Office, European search report on Aug. 4, 2023.
Taiwan Intellectual Property Office, First office action, on May 15, 2023.

*Primary Examiner* — Elizabeth E Mulvaney
(74) *Attorney, Agent, or Firm* — WPAT, PC

(57) ABSTRACT

The present invention provides an auxiliary film comprising a body and a plurality of microstructures formed on a first surface of the body, the microstructures include a concave-convex appearance on the first surface, and the microstructures have two ends extending to the periphery of the first surface respectively. When the auxiliary film is attached to a pre-protected surface of a substrate, the microstructures and the surface of the substrate form several open air channels to increase the separation efficiency of the main body from the substrate and reduce the overall process time.

23 Claims, 9 Drawing Sheets

(56) References Cited

U.S. PATENT DOCUMENTS

2020/0254680 A1 * 8/2020 Bergman .............. B29C 59/046
2021/0178798 A1 * 6/2021 Terzic ................... B41M 5/502

FOREIGN PATENT DOCUMENTS

WO      WO 2006/031468       *   3/2006
WO      WO 2015038767  A1      3/2015
WO      WO 2022/162528       *   8/2022

* cited by examiner

AUXILIARY FILM

BACKGROUND OF THE INVENTION

As technologies develop, electronic products are manufactured by highly-integrated automatic machines to manufacture diversified products with high efficiency and low cost. In addition, it is also desirable to avoid residue left during manufacturing process to pollute semi-finished products, and to ensure the semi-finished products have sufficient mechanical strength to survive the overall manufacturing process, including transportation between process stations, cutting, punching, or reel-to-reel mass production. These are some major challenges in modern manufacturing Currently, it is known to attach an auxiliary film with a release agent on the pre-protected surfaces of semi-finished products to avoid pollution in processes. The auxiliary film could also help the semi-finished goods have enough mechanical strength to survive the automatic manufacturing processes. Unfortunately, since the release agent is a chemical coating layer, it induce pollution of different levels for the devices on the pre-protected surfaces of semi-finished products. In addition, under the condition of high integration and assemblability, there are components with heterogeneous materials on the pre-protected surfaces of the semi-finished products. The heterogeneous materials have different attachment strength to the auxiliary films. Consequently, damages on the components may occur while removing the auxiliary films for the semi-finished goods.

Accordingly, the present invention provides a novel auxiliary film to solve the above problem of the prior art.

SUMMARY OF THE INVENTION

An objective of the present invention is to provide an auxiliary film, which comprises a plurality of microstructures on a surface of the auxiliary film. The plurality of microstructures include a concave-convex appearance on the surface of the auxiliary film. The plurality of microstructures have two ends extending to the peripheries of the surface of the auxiliary film. When the auxiliary film is disposed on the surface of a pre-protected substrate, the plurality of microstructures and the surface of the pre-protected substrate form multiple open air channels. Thereby, fluids can enter the space between the substrate and the auxiliary film via the open air channels. The auxiliary film with microstructures could increase the separability from the substrate, therefore the overall process time can be reduced.

To achieve the above objective and efficacy, the present invention provides an auxiliary film, which comprises a body and a plurality of microstructures formed on a first surface of the body to form an uneven surface. The plurality of microstructures includes a concave-convex appearance on the surface of the auxiliary film. The plurality of microstructures have two ends extending to the peripheries of the first surface. When the first surface of the body is attached to the pre-protected surface of a substrate, the plurality of microstructures contribute to form open air channels. By using the open air channels, the separation efficiency between the auxiliary film and the substrate can be enhanced. Therefore, the operation speed of manufacturing processes can be improved and thus the overall process time can be reduced.

DETAILED DESCRIPTION OF THE INVENTION

In order to make the structure and characteristics as well as the effectiveness of the present invention to be further understood and recognized, detailed description of the embodiments of the present invention is provided as follows.

To solve the above problems of the prior art, the present invention provides an auxiliary film, which includes a body and a plurality of microstructures formed on a first surface of the body to provide an uneven surface. Particularly, the plurality of microstructures include a concave-convex appearance on the first surface of the body. The plurality of microstructures have two ends extending to the peripheries of the first surface. When the first surface of the body is attached to the pre-protected surface of a substrate, the plurality of microstructures contribute to form a plurality of open air channels. With the open air channels, the separation efficiency between the auxiliary film and the substrate can be enhanced. Thereby, the operation speed of manufacturing process can be improved and thus the overall process time can be reduced.

In the following, various auxiliary film according to embodiments of the present invention are illustrated.

Figure 1:
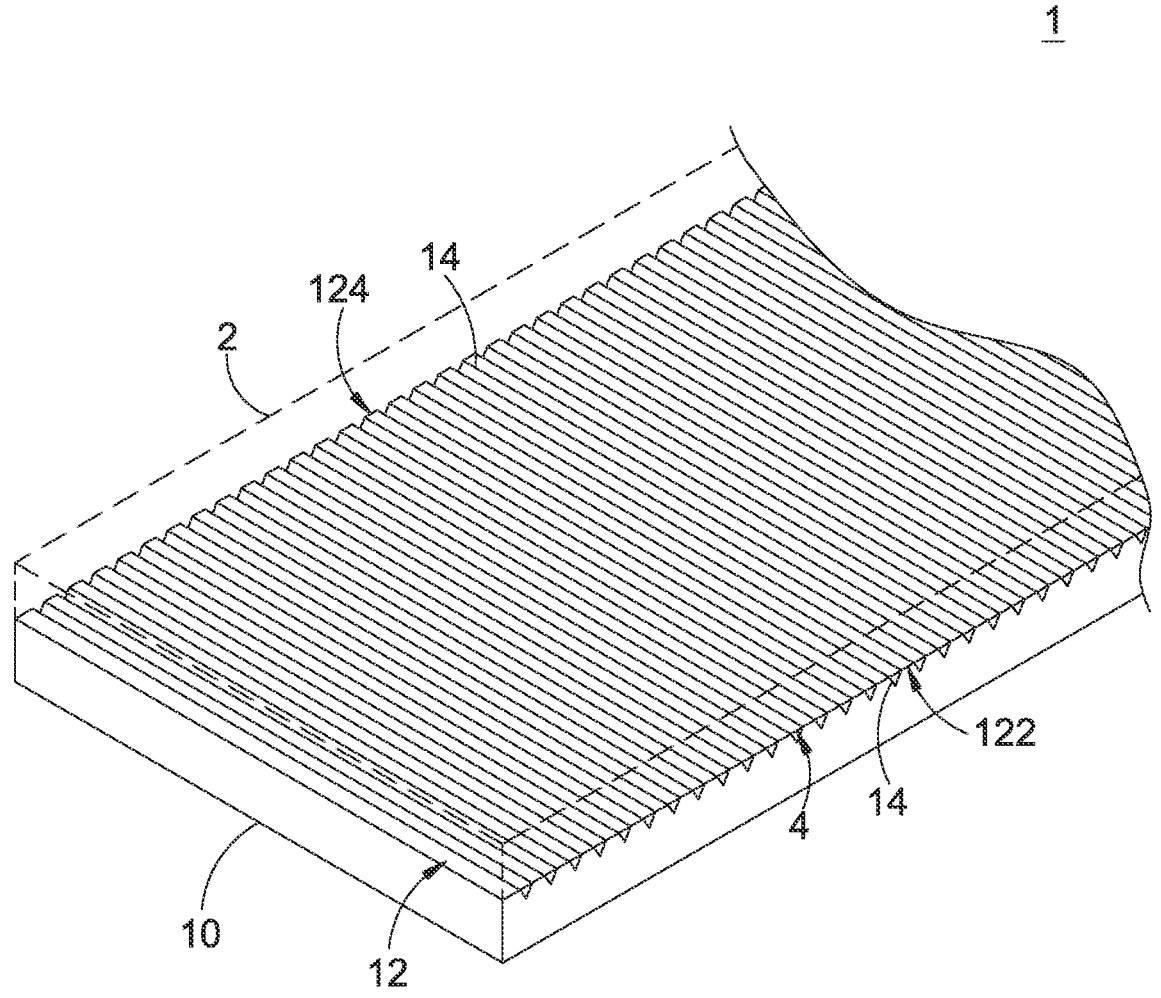
FIG. 1 shows a schematic diagram of the structure according to a first embodiment of the present invention.

Please refer to FIG. 1, which shows a schematic diagram of the structure according to a first embodiment of the present invention. As shown in the figure, the first embodiment provides an auxiliary film 1, which could be attached to a pre-protected surface 4 of a substrate 2. The auxiliary film 1 includes a body 10. According to the first embodiment, the body 10 is made of polymer material, for example, polyethylene (PE), polyethylene terephthalate (PET), polycarbonate (PC), polyimide (PI), polyvinyl chloride (PVC), polystyrene (PS), and poly(methyl methacrylate) (PMMA). Nonetheless, the present embodiment is not limited to the above examples.

Figure 2A:
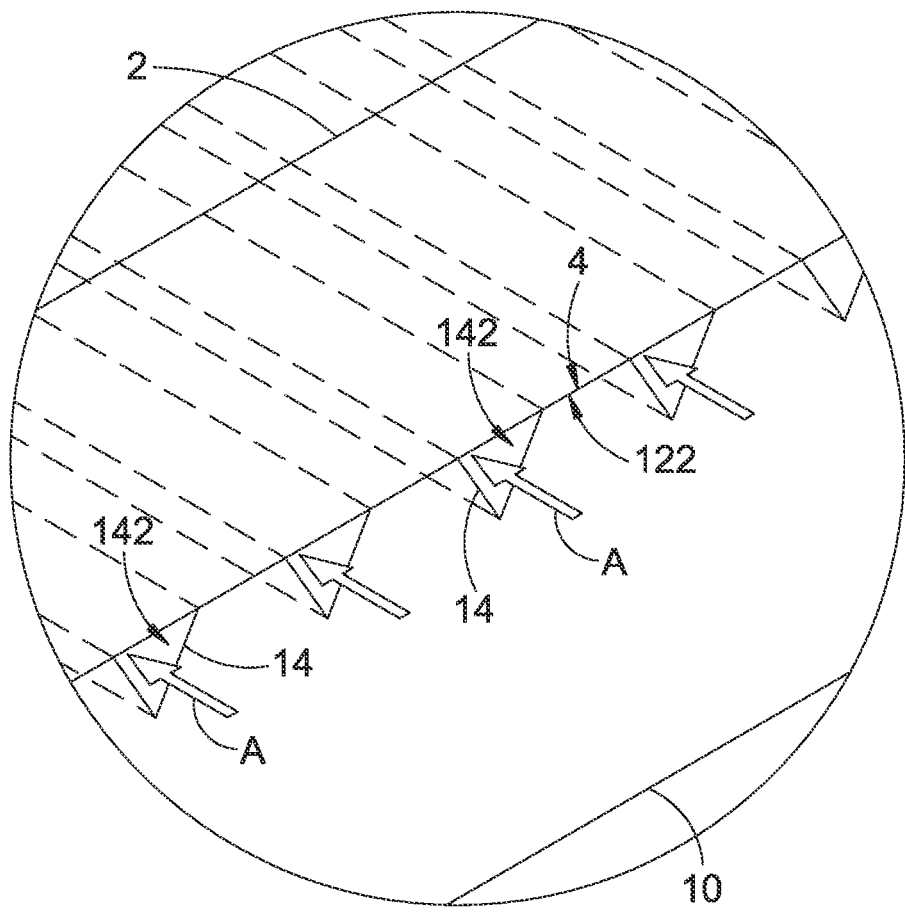
FIG. 2A shows a schematic diagram of the enlarged structure according to the first embodiment of the present invention.

Please refer to FIG. 1 and FIG. 2A. FIG. 2A shows a schematic diagram of the enlarged structure according to the first embodiment; it is an enlarged view of FIG. 1. As shown in the figures, a plurality of microstructures 14 (for example, a plurality of grooves) are formed on a first surface 12 of the body 10 to form an uneven surface configured to contact the pre-protected surface 4 of the substrate 2. The plurality of microstructures 14 include a concave-convex appearance on the first surface 12 of the body 10. The plurality of microstructures 14 have two ends extending to the peripheries of the first surface 12. According to the present embodiment, one end of the plurality of microstructures 14 extends to a first edge 122 of the first surface 12, while the other end of the plurality of microstructures 14 extends to a second edge 124 of the first surface 12. In other words, the plurality of microstructures 14 extend to the inner side of the first surface 12 via the first edge 122 and the second edge 124; the first edge 122 and the second edge 124 are the peripheries of the first surface 12. As shown in the figures, when the auxiliary film 1 is disposed on the pre-protected surface 4 of the substrate 1, the substrate 2 contacts the top side of the plurality of microstructures 14, forming a plurality of open air channels 142 between the substrate 2 and the plurality of microstructures 14. Namely, the plurality of open air channels 142 are formed between the substrate 2 and the first surface 12 of the body 10 of the auxiliary film 1, and the open air channels 142 extends to the peripheries of the first surface 12.

Figure 2B:
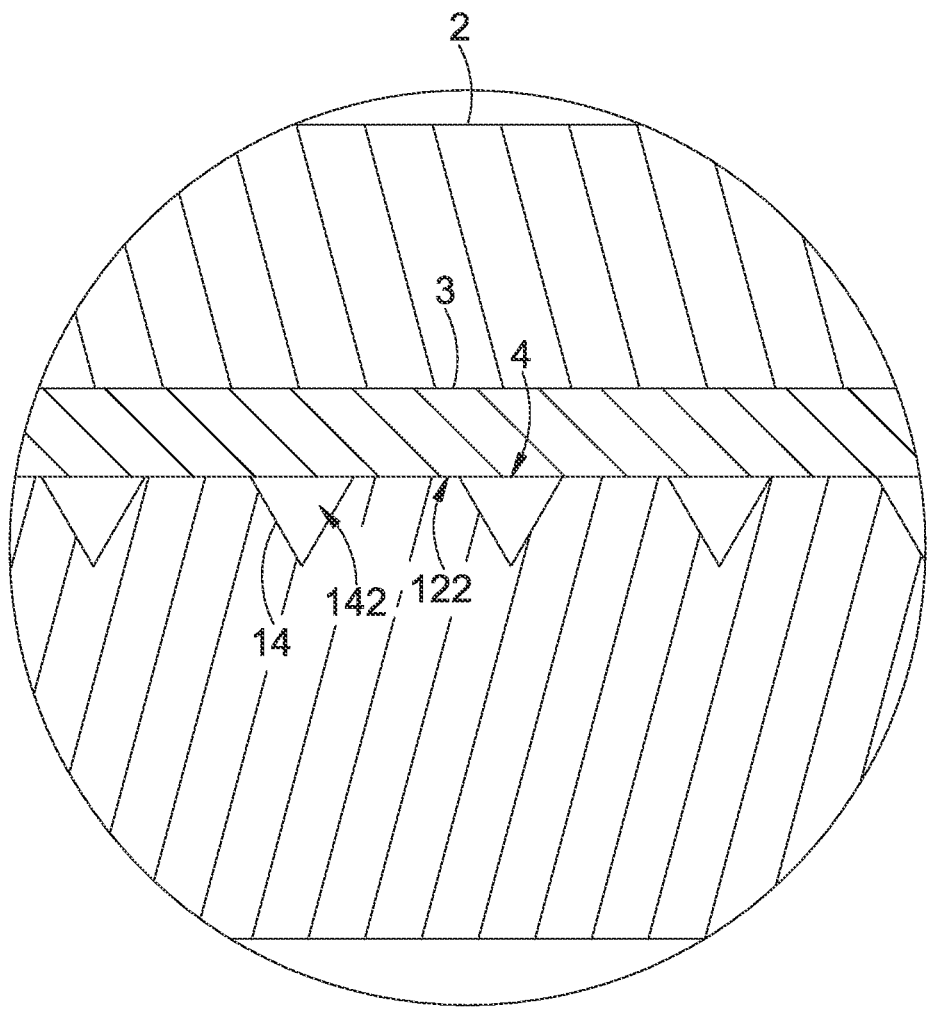
FIG. 2B shows a cross-sectional view of the structure according to the first embodiment of the present invention.

Please refer to FIGS. 1, 2A, and 2B. FIG. 2B shows a cross-sectional view of the structure according to the first embodiment of the present invention. As shown in the figures, according to the first embodiment, the pre-protected surface 4 of the substrate 2 includes one or more devices 3, for example, an electronic device and/or a device formed by chemical coating. When the auxiliary film 1 is disposed on the substrate 2, the device 3 located on the substrate 2 will contact the first surface 12 of the body 10 of the auxiliary film 1. Particularly, the device 3 on the substrate 2 will contact the plurality of microstructures 14 formed on the auxiliary film 1, and a plurality of open air channels 142 will be formed between the substrate 2 and the auxiliary film 1. And the open air channels 142 extends to the peripheries of the first surface 12 of the body 10. According to the present embodiment, the device 3 may be a battery module, a semiconductor chip, a biosensing material coating, or a silica gel coating. When the device 3 is an electronic device such as a battery module or a semiconductor chip, the substrate 2 may be a circuit board, for example, a flexible circuit board.

According to the first embodiment, the plurality of microstructures 14 include a concave-convex appearance on the first surface 12 of the body 10, and the plurality of microstructures 14 include a plurality of grooves on the first surface 12 configured to form the open air channels 142 between the substrate 2 and the plurality of microstructures 14 when the auxiliary film 1 is attached to the substrate 2.

According to the first embodiment, the plurality of microstructures 14 are V-shaped structures used for guiding fluids, for example, air, to enter the open air channels 142 formed between the auxiliary film 1 and the substrate 2. In addition, according to the present embodiment, the distance between the plurality of microstructures 14 can be adjusted according to the material properties of the substrate 2 and the device 3 disposed on the pre-protected surface 4 as well as other requirements of the specific manufacturing process, for example, the attachment capability between the auxiliary film 1 and the substrate 2 in some manufacturing processes.

Figure 2C:
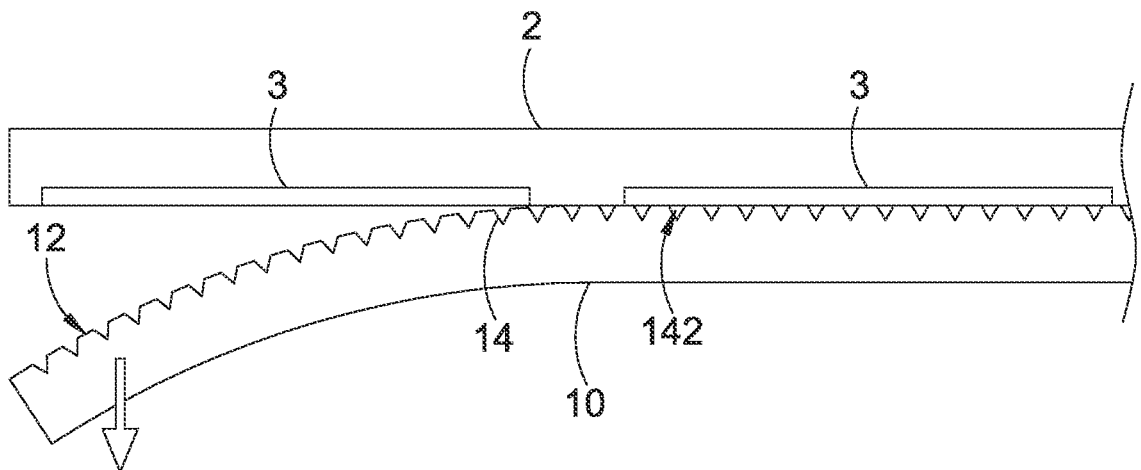
FIG. 2C shows a schematic diagram of separation of the auxiliary film and the substrate according to the first embodiment of the present invention.

Please refer to FIG. 1 to FIG. 2C. FIG. 2C shows a schematic diagram of separation of the auxiliary film and the substrate according to the first embodiment of the present invention. As shown in FIG. 2A, a fluid A flows into the plurality of open air channels 142 from the openings on the peripheries of the plurality of microstructures 14. Since the open air channels 142 include openings with communicating ends, the fluid A can flow in and out of the open air channels

142 freely. The plurality of microstructures 14 contribute to reducing the total contact area between the substrate 2 and the auxiliary film 1, so the removal of the auxiliary film 1 from the substrate 2 can be facilitated. In addition, the flowing air can effectively avoid the vacuum-like suction effect caused by the pressure between the substrate 2 and the auxiliary film 1 in the attachment procedure, so the auxiliary film 1 may be easily separated from the substrate 2. Since the auxiliary film 1 can be quickly removed from the substrate 2 without affecting the device 3 located on the substrate 2, the processing speed of the production line can be greatly improved. Further, when a release agent is coated on the first surface 12 of the auxiliary film 1, since the contact area between the substrate 2 and the auxiliary film 1 (and/or the device 3 located on the substrate 2) is reduced due to the microstructures 14 having concave-convex appearance on the first surface 12, the residue of the release agent left on the device 3 and the substrate 2 is also reduced when the auxiliary film 1 is removed from the substrate 2. Thus the pollution of the release agent to the device 3 and/or the substrate 2 is also reduced.

Figure 3:
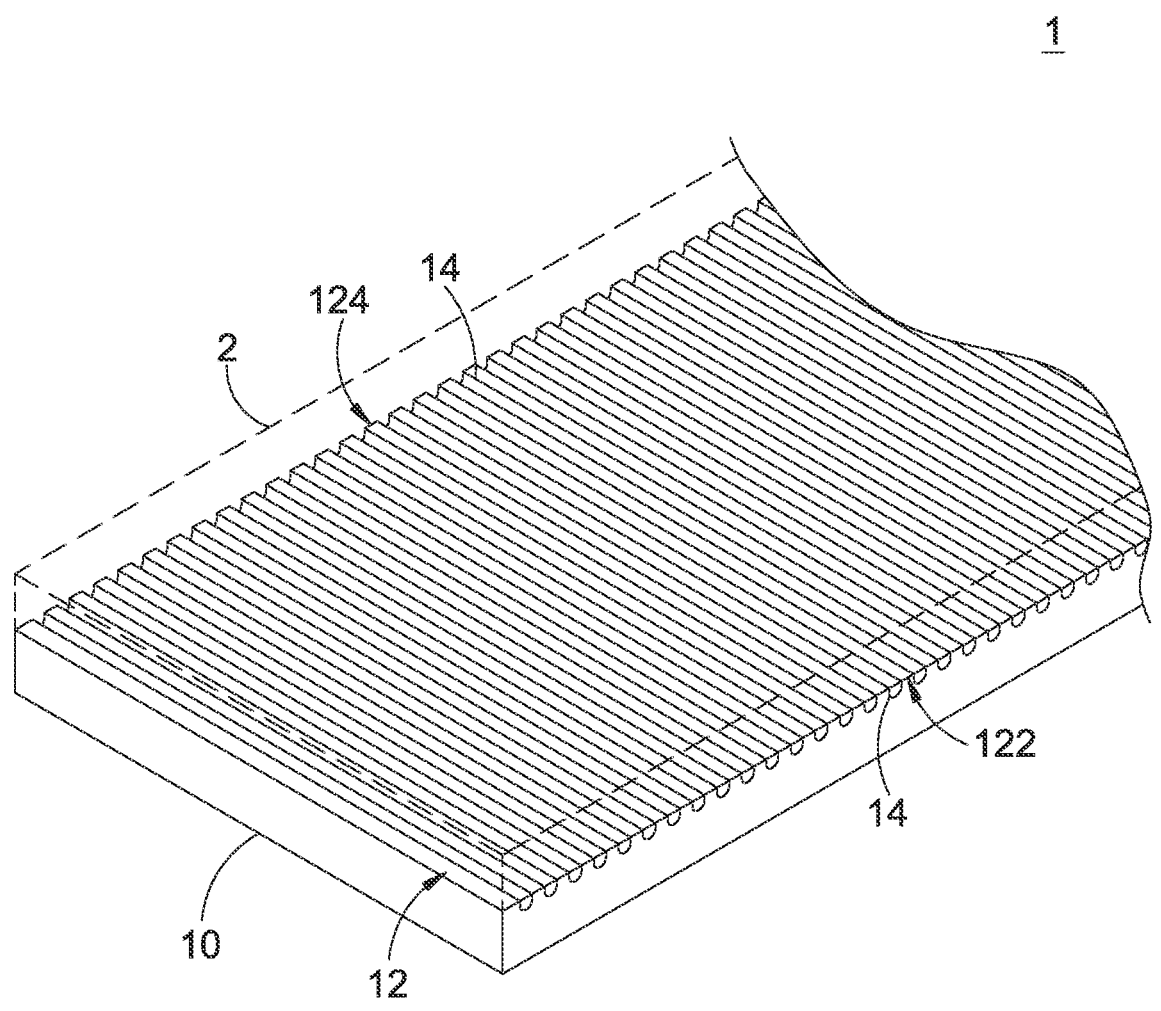
FIG. 3 shows a schematic diagram of the structure according to the second embodiment of the present invention.
Figure 4:
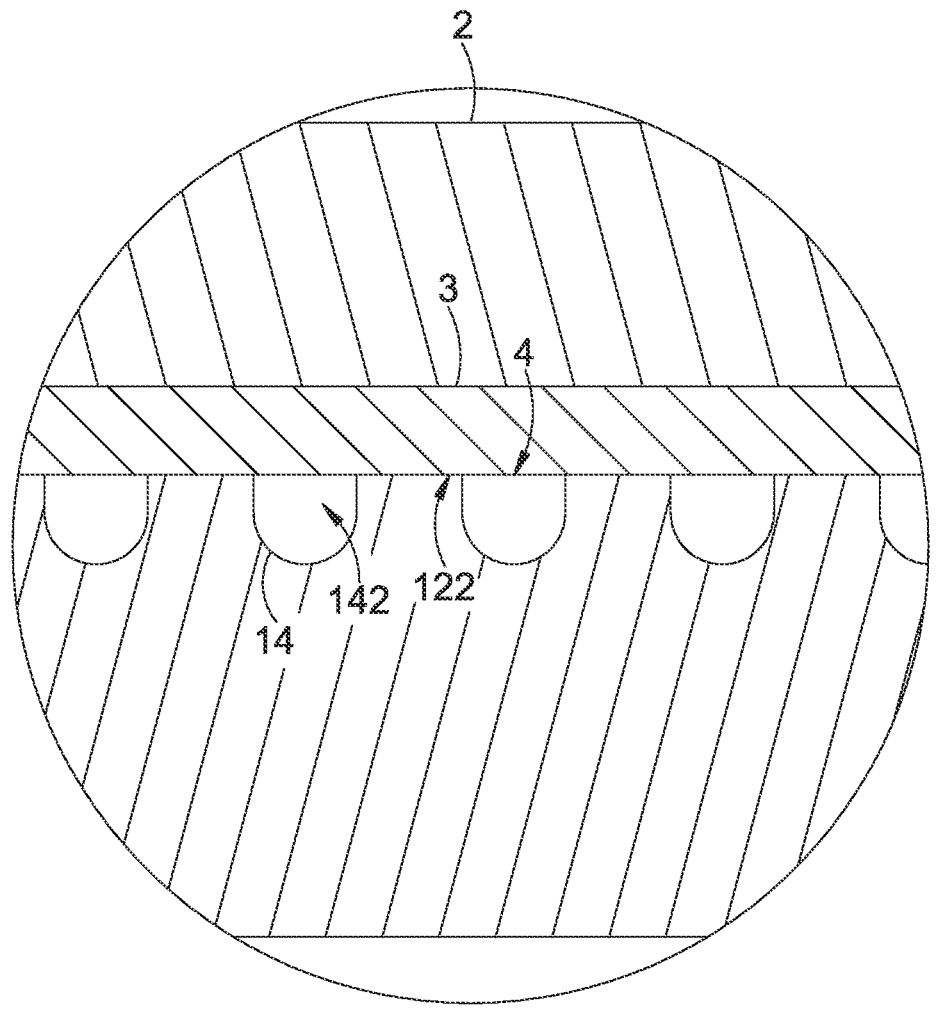
FIG. 4 shows an enlarged cross-sectional view of the structure according to the second embodiment of the present invention.

Please refer to FIG. 3 and FIG. 4. FIG. 3 shows a schematic diagram of the structure according to a second embodiment of the present invention; FIG. 4 shows an enlarged cross-sectional view of the structure in FIG. 3. As shown in the figures, according to the second embodiment, the plurality of microstructures 14 are U-shaped.

Figure 5:
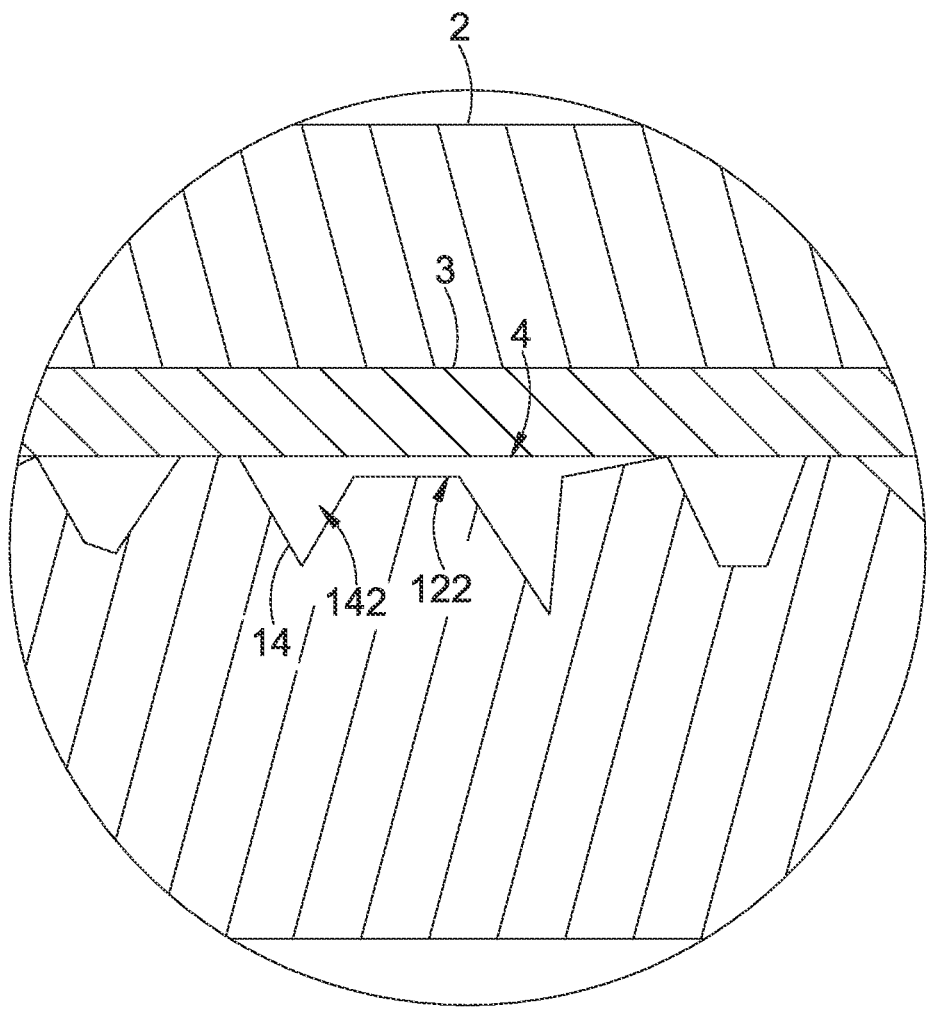
FIG. 5 shows a schematic diagram of the microstructures according to a fourth embodiment of the present invention.
Figure 6:
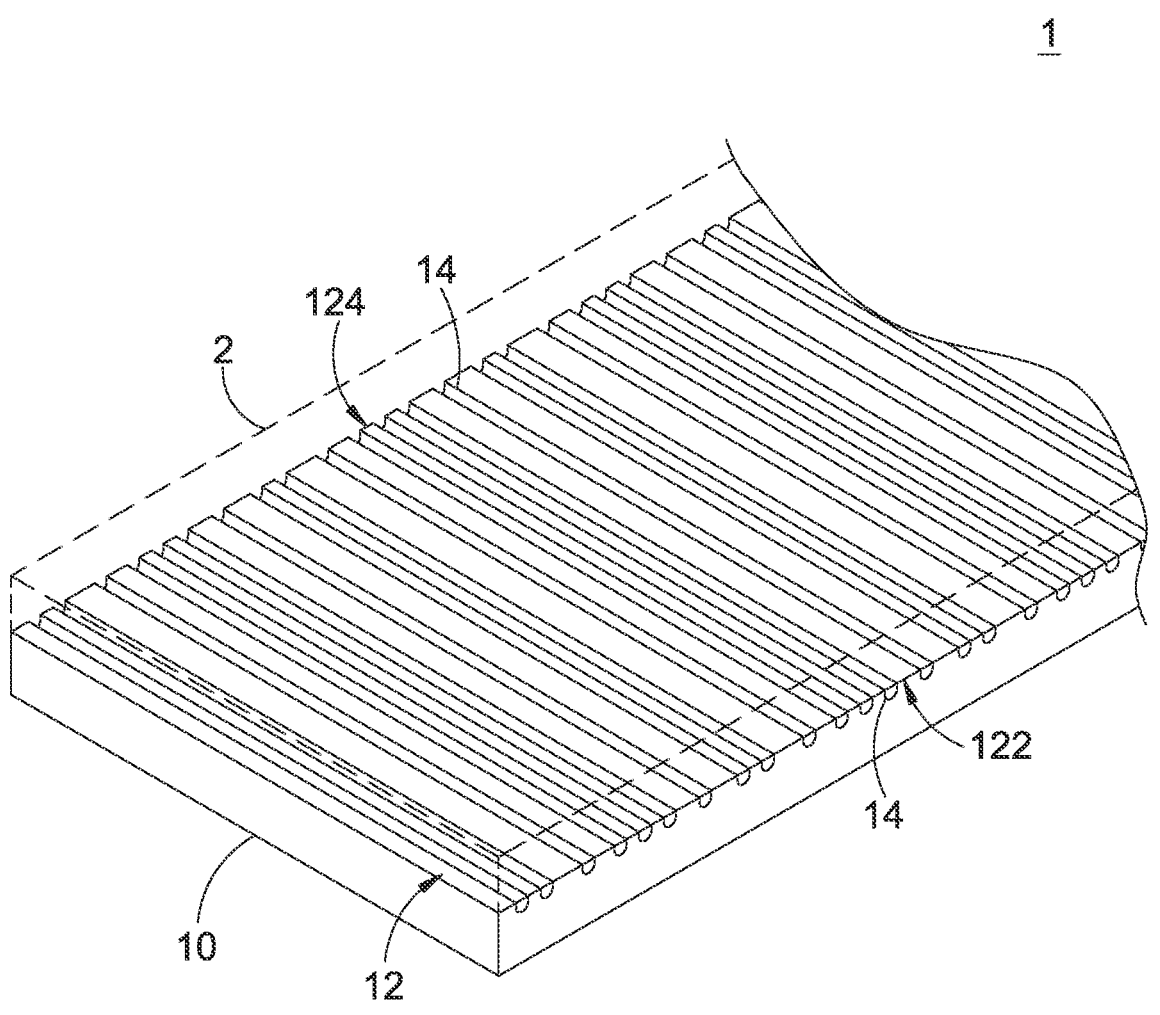
FIG. 6 shows a schematic diagram of the microstructures according to a third embodiment of the present invention.

Please refer to FIG. 6, which shows a schematic diagram of the microstructures according to a third embodiment of the present invention. According to the third embodiment, in addition to having substantially identical shapes, the plurality of microstructures 14 formed on the first surface 12 may have different shapes. In addition, the distance between two adjacent microstructures 14 may be different and thus form unevenly distributed microstructures 14 on the surface 12 of the body 10 of the auxiliary film 1. For example, FIG. 5 shows a schematic diagram of the microstructures according to a fourth embodiment of the present invention. As shown in FIG. 5, the plurality of microstructures 14 according to the fourth embodiment exhibit irregular and different shapes.

A preferred arithmetic average roughness of the microstructures 14 (i.e., the roughness of the concave-concave appearance on the first surface 12) according to the embodiments of the present invention is between 0.1 and 0.5 micrometers for achieving preferred separation efficiency. Nonetheless, the preferred arithmetic average roughness value range of these embodiments should not be used to limit the scope of the present invention.

Figure 7:
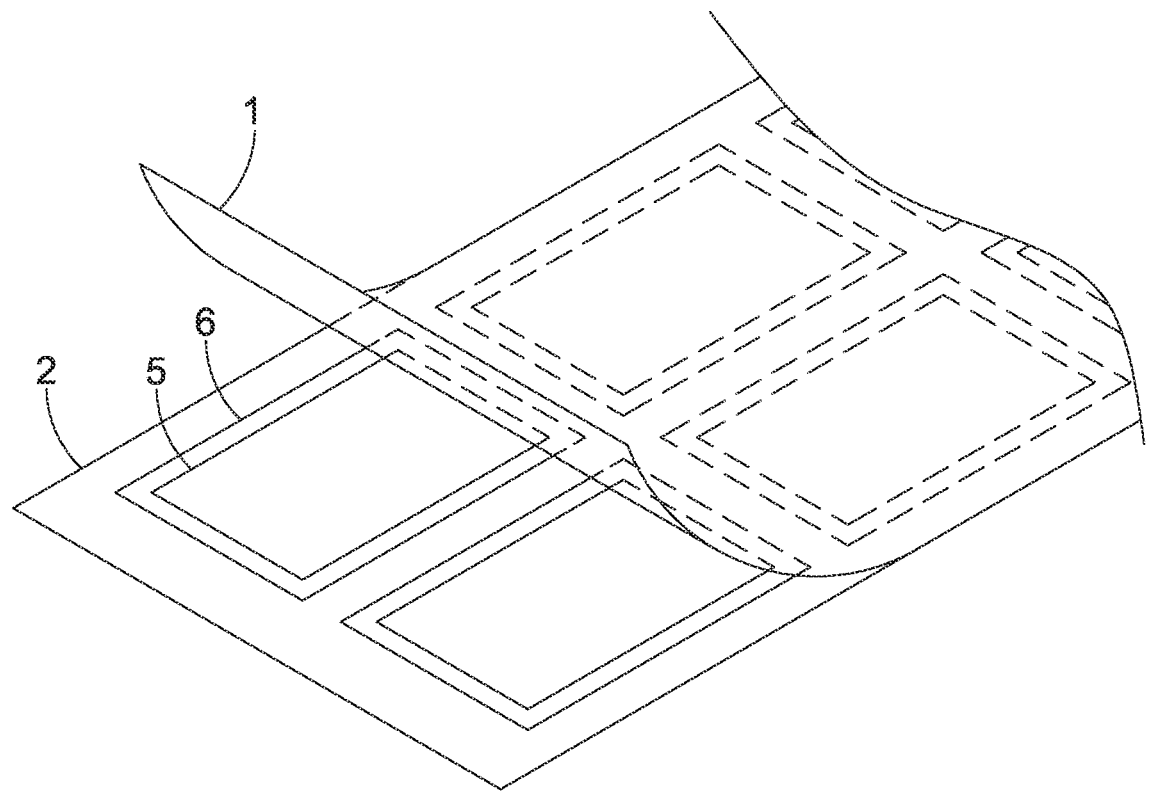
FIG. 7 shows a schematic diagram of the application of the structure according to the embodiments of the present invention.

Please refer to FIG. 7, which shows a schematic diagram of the application of the structure according to the embodiments of the present invention. As shown in the figure, the auxiliary film 1 may also be applied to reel-to-reel mass production of the battery industry such as slab-shaped lithium batteries. In the application, for example, the substrate 2 may be a flexible metal substrate acting as the charge collecting layer. The protected surface pre-attached with the auxiliary film includes heterogeneous devices. The heterogeneous devices, for example, include an active-material pattern layer 5 and a glue frame layer 6 surrounding the active-material pattern layer 5. The material of the glue frame layer 6 can be silica gel. The heterogeneous devices may induce adherence with different intensity to the auxiliary film 1 and hence lead to inferior separation from the auxiliary film according to the prior art. Thanks to the open air channels, the auxiliary film according to the embodiments of the present invention can solve the problem effectively.

To sum up, the present invention provides an auxiliary film, which comprises a body and a plurality of microstructures formed on a first surface of the body to form an uneven surface. The plurality of microstructures have two ends extending to the peripheries of the first surface. When the first surface of the body is attached to the pre-protected surface of a substrate, the plurality of microstructures contribute to form open air channels between the auxiliary film and the substrate. With the open air channels, the separation efficiency between the auxiliary film and the substrate can be enhanced. Thereby, the operation speed of manufacturing processes can be improved and thus the overall manufacturing time can be reduced. The present invention solves the problems encountered in the prior art. In the prior art, since the separation capability of release films is insufficient, the release agent might adhere to and eventually peel off the electronic devices on the substrate, leading to damages or pollution of the devices. Consequently, the production yield will be reduced and thus extra costs will be induced.

Accordingly, the present invention conforms to the legal requirements owing to its novelty, nonobviousness, and utility. However, the foregoing description is only for embodiments of the present invention, and should not be used to limit the scope and range of the present invention. Substantially equivalent changes or modifications made to the shape, structure, feature, or spirit described in the claims of the present invention are also included in the present invention.

The invention claimed is:

1. An auxiliary film, comprising:

a body having a first surface, said body made of a polymer material selected from a group consisting of polyethylene, polyethylene terephthalate, polycarbonate, polyimide, polyvinyl chloride, polystyrene, and poly(methyl methacrylate); and a plurality of microstructures formed on said first surface to form an uneven surface, and said plurality of microstructures having two ends extending to peripheries of said first surface;

wherein when said first surface of said body is attached to a pre-protected surface of a substrate, said plurality of microstructures form open air channels between said plurality of microstructures and said pre-protected surface; and wherein said plurality of microstructures are integrally formed with said body, and said plurality of microstructures are a part of said body.

2. The auxiliary film of claim 1, wherein an arithmetic average roughness of said uneven surface is between 0.1 and 0.5 micrometers.

3. The auxiliary film of claim 1, wherein said plurality of microstructures are V-shaped or U-shaped.

4. The auxiliary film of claim 1, wherein said plurality of microstructures have different shapes.

5. The auxiliary film of claim 1, wherein the distances between said plurality of microstructures are variable.

6. An auxiliary film for attaching to a pre-protected surface of a substrate, comprising:

a body having a first surface, the body made of a polymer material selected from a group consisting of polyethylene, polyethylene terephthalate, polycarbonate, polyimide, polyvinyl chloride, polystyrene, and poly(methyl methacrylate); and a plurality of microstructures formed on the first surface to form a concave-convex appearance on the first surface, and the plurality of microstructures having two ends extending to peripheries of the first surface;

wherein when the first surface of the auxiliary film is attached to the pre-protected surface of the substrate, a plurality of open air channels extending to the peripheries of the first surface are formed between the first surface and the pre-protected surface; and wherein the plurality of microstructures are integrally formed with said body, and the plurality of microstructures are a part of the body.

7. The auxiliary film of claim 6, wherein an arithmetic average roughness of the concave-convex appearance on the first surface is between 0.1 and 0.5 micrometers.

8. The auxiliary film of claim 6, wherein the plurality of microstructures are V-shaped or U-shaped.

9. The auxiliary film of claim 6, wherein the plurality of microstructures have different shapes.

10. The auxiliary film of claim 6, wherein the plurality of microstructures are unevenly distributed on the first surface.

11. A system including a substrate having a pre-protected surface, and an auxiliary film for attaching to the pre-protected surface of the substrate, the auxiliary film comprising:

a body having a first surface, the body made of a polymer material selected from a group consisting of polyethylene, polyethylene terephthalate, polycarbonate, polyimide, polyvinyl chloride, polystyrene, and poly(methyl methacrylate); and a plurality of microstructures formed on the first surface to form a concave-convex appearance on the first surface, and the plurality of microstructures having two ends extending to peripheries of the first surface;

wherein when the first surface of the auxiliary film is attached to the pre-protected surface of the substrate, a plurality of open air channels extending to the peripheries of the first surface are formed between the first surface and the pre-protected surface; and wherein the plurality of microstructures are integrally formed with the body, and the plurality of microstructures are a part of the body.

12. The system of claim 11, wherein the pre-protected surface of the substrate includes one or more device contacting the first surface when the auxiliary film is attached to the pre-protected surface of the substrate.

13. The system of claim 11, wherein the pre-protected surface of the substrate includes two or more heterogeneous devices contacting the first surface when the auxiliary film is attached to the pre-protected surface of the substrate.

14. The system of claim 13, wherein one of the two or more heterogeneous devices includes silica gel.

15. The system of claim 11, wherein the substrate is a metal substrate.

16. The system of claim 11, wherein the substrate is a charge collecting layer of a slab-shaped lithium battery.

17. The system of claim 11, wherein an arithmetic average roughness of the concave-convex appearance on the first surface is between 0.1 and 0.5 micrometers.

18. The system of claim 11, wherein the plurality of microstructures are unevenly distributed on the first surface.

19. The system of claim 11, wherein said plurality of microstructures are V-shaped or U-shaped.

20. The system of claim 11, wherein the plurality of microstructures have different shapes.

21. The auxiliary film of claim 1, wherein said first surface is further coated with a release agent.

22. The auxiliary film of claim 6, wherein the first surface is further coated with a release agent.

23. The system of claim 11, wherein the first surface is further coated with a release agent.

\* \* \* \* \*